United States Patent
Lang

[15] 3,701,012
[45] Oct. 24, 1972

[54] CIRCUIT AND METHOD FOR DEVELOPING SIGNAL INDICATIVE OF UNKNOWN FREQUENCY

[72] Inventor: Gordon R. Lang, Bolton, Ontario, Canada

[73] Assignee: E. S. E. Limited, Rexdale, Ontario, Canada

[22] Filed: July 6, 1970

[21] Appl. No.: 52,472

[52] U.S. Cl. .................................. 324/79 R, 328/140
[51] Int. Cl. ............................................. G01r 23/14
[58] Field of Search .324/79; 328/140, 134; 329/124, 329/122, 50

[56] References Cited

UNITED STATES PATENTS 2,964,622  12/1960  Fire....................... 324/79 UX

FOREIGN PATENTS OR APPLICATIONS 740,130  10/1943  Germany.....................324/79

Primary Examiner—Alfred E. Smith
Attorney—Westell and Hanley

[57] ABSTRACT

An unknown signal is mixed with a first reference signal and, in a separate mixing, with a second reference signal obtained by altering the phase of the first reference signal by $\pi/2$ radians (where the signals are of the same frequency). The sum or the difference product of the first mixing is filtered out and the corresponding product of the second mixing is also filtered out; one of the two last-mentioned products is delayed relative to the other, and then the undelayed product and the delayed product are mixed while ensuring that the products mixed are of substantially constant amplitude.

28 Claims, 2 Drawing Figures

PATENTED OCT 24 1972          3,701,012

INVENTOR.
GORDON R. LANG
BY
Westell & Hanley

CIRCUIT AND METHOD FOR DEVELOPING SIGNAL INDICATIVE OF UNKNOWN FREQUENCY

This invention provides circuitry and a method of developing from an unknown and a reference signal a signal whose amplitude varies as (and is preferably proportional to) the sum or the difference of the reference and unknown frequency (a matter of choice) and (in one embodiment) whose sense is indicative of the sense of the difference between the reference and the unknown frequency.

The results obtainable through the inventive method are obtained over a frequency range determined in accord with operating criteria which will be discussed hereafter.

The inventive circuitry comprises means for providing a reference frequency $fo$ for performing operations in conjunction with an unknown frequency $fi$. (In the application to follow, the terms $\omega_o$ which is $2\pi fo$ and $\omega_1$ which is $2\pi f1$ are more commonly used). Means are provided for combining the signals $A \sin \omega_o t$ with the signal $B \sin \omega_1 t$ at one mixer (where B is the amplitude of the unknown signal and A is the amplitude of the reference signal).

In many aspects of the invention is will be important to have the values of A and B constant. Hence the unknown signal and the reference signal if necessary, will be passed through amplitude regulators or limiters which will assure that the amplitudes of the two signals are constant. Such amplitude regulators or limiters in their commonest conventional form will create harmonics of the signal with which operations are to be performed. These, whether negligible or not, will be of smaller amplitude at the output of the filter, than the basic frequency. It will be understood that, if the harmonics are not negligible, their effect may be rendered so in a number of ways. A filter otherwise used in the system may incidentally eliminate such harmonics. Alternatively, a filter may be placed at the output of a limiter for the same purpose. Lastly, a limiter, less common, but conventionally available may be used which ensures that such harmonics are negligible.

The reference frequency is, on a second circuit, provided with a $\pi/2$ phase shift and mixed with the unknown signal.

As a result, at each mixing location, there is available an output having the frequencies of the sum, the difference, and the two input frequencies. At each mixer output, filtering is applied to derive, at the filter output, a signal corresponding to either the sum, or to the difference of the applied frequencies and a similar algebraic result (i.e., sum or difference) is derived at both filters.

One of these signals is subjected to a time delay which, in accord with the scope of the invention may, for varying selected uses, be either a constant or a function of frequency.

The filter output signals, one subject to a delay as aforesaid are combined at a mixer. It may be established that the output of the mixer comprises a component varying, and a component non-varying with time. (The component non-varying with time, does of course vary with the unknown frequency.)

As later explained, the non-time-varying component will be found to contain the desired information. By applying the last-mentioned mixer output to a low pass filter, integrator or other device averaging amplitude over time of properly selected characteristics, the time varying component may be eliminated to the degree practically required. The non-varying component will be found to have an amplitude varying as the product of the input amplitudes and a function of the frequency difference. However, the effect of the input amplitudes has been eliminated by the provision of amplitude regulators as already described and the amplitude will therefore be indicative of the frequency difference. By the proper choice of operating criteria, the signal will have in at least one embodiment a sign, indicative of the sense of the frequency difference between the unknown and the reference frequency, and an amplitude varying as the amount of the frequency difference between the reference and unknown signal. In accord with the operation of the invention such frequency difference may only be determined without ambiguity up to predetermined limits.

Figure 1:
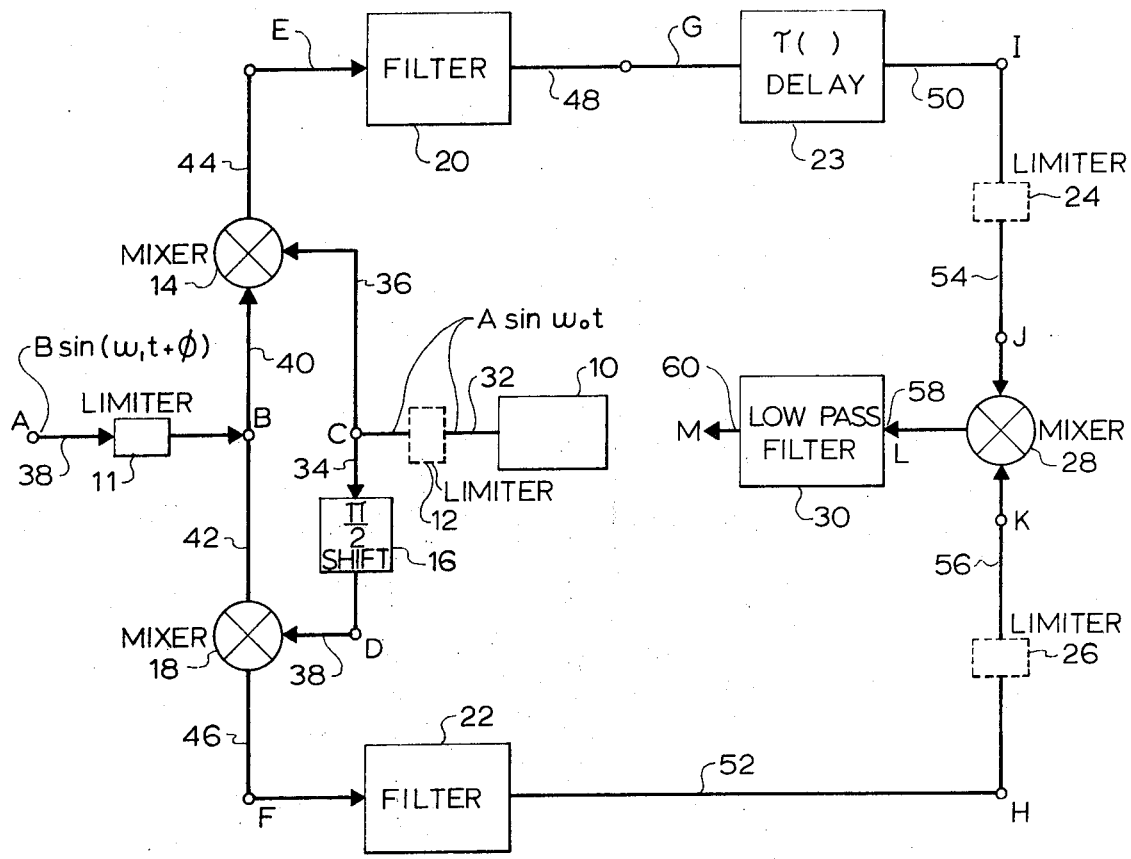
FIG. 1 shows a block diagram of a circuit in accord with the invention.

In the drawings is shown a signal of unknown frequency $B \sin (\omega_1 t + \phi)$ applied to line 38 at point A. To assure a known amplitude this signal is passed through amplitude regulator 11 designed to provide an output of less amplitude than any amplitude of the unknown signal which will be received at Point A. A reference signal generator 10 which may be of any one of a number of well known types is connected to supply, along line 32, a reference signal $A \sin \omega_o t$ where $\omega_o$ is $2\pi$ times the reference frequency. The amplitude may probably be controlled as a constant within the design of signal source 10. However, if necessary to obtain such signal an amplitude regulator 12 will be provided on line 32, in which case the signal $A \sin \omega_o t$ is considered as the signal appearing at the output of limiter 32.

The signal $A \sin \omega_o t$ is applied directly to a mixer 14 along line 36 and along line 34 to a device 16 which causes, by any one of a number of well known means a $\pi 2$ phase shift to the signal. This phase shift may be in either sense. The resultant signal produced at the output of shift device 16 is therefore substantially $-A \cos \omega_o t$ and is supplied along line 38 to mixer 18.

The unknown signal $B \sin (\omega_1 t + \phi)$ is applied along line 40 and 42 respectively to mixers 14 and 18.

The mixers 14 and 18 are similar in nature and are heterodyning devices which produce, at their outputs, the sum of, the difference of and each of the original frequencies. (Mixers of the commonest type also, produce, at their outputs, the two input frequencies. This may be unimportant where the input frequencies are such as to be filtered out, incidentally by other filters in the system. However, it will generally be found better if balanced mixers are used since these only put out the sum and difference frequencies. Thus where "-mixers" are referred to hereafter, it will be understood that balanced mixers are intended). It will be obvious that the sum frequency will be higher and the difference frequency will be lower than the other three frequencies. Hence the sum or the difference frequency will be easily selectable by filtering from the mixer outputs.

In the first example given, the output desired is the difference frequency hence filters 20 and 22 are designed to pass the respective difference frequencies received at their inputs and to filter out the other components.

The output of filter 20 will therefore be $K_1 \cos[(\omega_o - \omega_1)t - \phi]$ where $K_1$ is substantially a constant; while the output of filter 22 is $K_2 \sin[(\Phi_o - \omega_1)t - \phi]$ where $K_2$ is substantially a constant. Quantities designed K will hereinafter be taken as designating constants.

In accord with the invention one of the filter outputs is subjected to a time delay $\tau$ relative to the other. The time delay applied may vary in accord with the intended function of the circuit to which the inventive circuitry is put. However, such delay will be either a constant or a function of the applied frequency, here $(\omega_o - \omega_1)$. An example of a delay, a function of $(\omega_o - \omega_1)$ which would be suitable for many purposes is an all pass filter. The delay at a delay device 23 is here applied to the output of filter 20.

The output of delay 23 is therefore $K_3 \cos[(\omega_o - \omega_1)(t - \tau - \phi]$ where $\tau$ is defined as heretofore. For the purposes of obtaining a unique result, $\tau$ is chosen so in accord with the expected frequency difference $(\omega_o - \omega_1)$ so that $(\omega_o - \omega_1)\tau$ lies in a range of not more than $\pi$ between odd $\pi/2$ values, e.g., between $-\pi/2$ and $\pi/2$ or between $\pi/2$ and $3\pi/2$ and so on.

Figure 2:
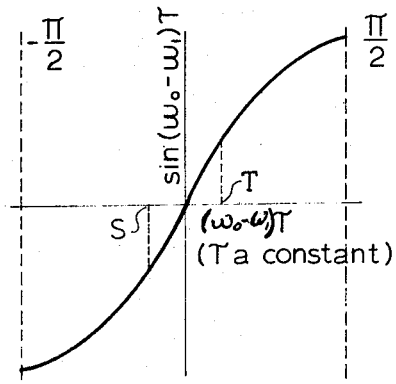
FIG. 2 shows a graph of the relationship of frequency to difference frequency.

The outputs of delay 23 and filter 22 are to be combined at a mixer 28. If, due to any circuit or other effects the amplitude factors $K_2$ and $K_3$ of the two signals are not sufficiently constant the respective signals may be passed through amplitude regulators 24 and 26, respectively, to mixer 28. The signal at the output of mixer 28 for practical purposes will be found to be $K_4 \sin(\omega_o - \omega_1)\tau + K_4 \sin[2(\omega_o - \omega_1)t - 2\phi - (\omega_o - \omega_1)\tau]$ It will thus be seen that the first part of the above sum is invariant with time while the second part of the above sum varies with time. Passing the output of mixer 28 through a low pass filter 30 effectively eliminates the second part of the sum except in situations where $2(\omega_o - \omega_1)t$ is small enough to pass the low pass filter. In other situations the signal $K_4 \sin(\omega_o - \omega_1)\tau$ representing the output of low pass filter 30 represents for $-\pi/2 \leq (\omega_o - \omega_1)\tau \leq \pi/2$ by its sign the sense of the difference $(\omega_o - \omega_1)$ and by its amplitude the magnitude of $(\omega_o - \omega_1)$. The schematic indication of $\sin(\omega_o - \omega_1)\tau$ for $\tau$ a constant is shown in FIG. 2. Thus $\tau$ is, as previously suggested, chosen so that $\sin(\omega_o - \omega_1)\tau$ is between and unique between $-\pi/2 \leq (\omega_o - \omega_1)\tau \leq \pi/2$ or over any range of $(\omega_o - \omega_1)\tau$ between odd integral $\pi/2$ boundaries. If desired $\tau$ may be selected, in relation to the expected variation of the difference $(\omega_o - \omega_1)$ to provide the sine $(\omega_o - \omega_1)\tau$ will be a linear function of $(\omega_o - \omega_1)$ say in the range S to T of FIG. 2. Alternatively $\tau$ may be chosen a function of $(\omega_o - \omega_1)$ to extend the linear range of sine $(\omega_o - \omega_1)\tau$ beyond such limits as S & T and toward the $\pm \pi/2$ (equivalent boundaries). Also $\tau$ may be chosen to correct for deficiencies in the amplitude-frequency characteristics in the line connecting B and K and the line connecting B and J.

It will be noted that the delay $\tau$, subject to the criteria as above described may be located in line 52 instead of line 48–50 within the scope of the invention, the results still accruing and the advantages still being present although a change in sign in the mixer 28 output will result, not altering, where applicable the one to one correspondence between the sign of the filter output and the sign of the difference of the unknown and reference frequencies.

The output of the filter 60, carrying as it does a signal whose magnitude and sign indicate the magnitude and sense of the frequency difference may be used in large number of ways, only a few of which will be mentioned. Obviously the signal may be used to energize a meter or other indicator or indication of the unknown frequency value. Moreover the signal could be fed back to a frequency control for the unknown signal to act as the actuating signal for a frequency controller. Also the signal may be used to control the frequency of reference frequency source 10 to bring it close to the unknown source the source 10 is a variable frequency device). However, such a controlled source 10 is included within the term 'reference frequency' as used in the disclosure and claims. Further, the signal 60 may be used to bring the frequency of the unknown or the reference frequency closer to the other to accelerate the operation of a phase locking system, it being well known that such phase locking devices operate faster when the frequency difference is small.

It will be understood that the limits of the accuracy of the signal from low pass filter 30 as indicative of frequency difference are controlled in one sense by the level of the effective band pass of filter 30 since for any low pass filter 30 there will be a frequency which will pass, and to this extent, the time varying component of the input signal will appear at the output and introduce errors into the signal. On the other hand it must be remembered that, where the unknown frequency varies from time to time, it will be desirable if the low pass filter pass frequencies large enough to reflect the changes in the unknown frequency. Thus the cut-off frequency of low pass filter 30 will be a compromise design to meet the requirements of a given situation. However, it will usually be found advisable to design the filter to make the time varying component small relative to the no-time varying component.

As an alternative to the construction described, a signal indicative of frequency difference, magnitude and sense may be obtained by substituting high pass for low pass filters at 20 and 22, with the high pass filters designed to select from their inputs, and provide at their outputs the 'sum' frequency signals $-K_4 \cos](\omega_o + \omega_1)t + \phi]$ and $-K_s \sin[(\omega_o + \omega_1)t + \phi]$ where $K_4$ and $K_s$ are constants determined by the output of amplitude regulator 11, the output of signal source 10, with or without the amplitude regulator 12, mixers, filters, etc.

As before, one of these signals is provided with a delay $\tau$ which is either a constant or a function of frequency, i.e., of $(\omega_o + \omega_1)$. Choosing to again apply the delay to the output of filter 20, the signal at the output of the delay device becomes: $-K_6 \cos[(\omega_o + \omega_1)(t + \tau) + \phi]$ $K_6$ being a constant, and when these signals are mixed at mixer 28, the output becomes, where $K_7$ is a constant: $K_7 \sin(\omega_o + \omega_1)\tau + K_7 \sin[2(\omega_o + \omega_1)t + 2\phi - (\omega_o + \omega_1)\tau]$ Again it is seen that (considering $\omega_o$ and $\omega_1$ constants for the moment), the output of mixer 28 contains a component varying with time and a component invariant with time. In this case the low pass filter 30 need only filter out frequencies higher than $2\omega_o$ or perhaps higher depending on the range of frequencies determining $\omega_1$.

The output of filter 30 will then be $K_8 \sin(\omega_o + \omega_1)\tau$

Thus $\tau$ must again be chosen so that $(\omega_o + \omega_1)\tau$ is between adjacent odd integral $\pm \pi/2$ limits. Thus the signal from filter 30 will vary in amplitude with the magnitude of $(\omega_o + \omega_1)$. As before $\tau$ may be chosen to give a smaller range within the above limits, to achieve a more linear result. Also, as before, $\tau$ may be designed as a function of $(\omega_o + \omega_1)$ to extend, within the $\pi/2$ limits, the linear range. It will be noted, with the alternative embodiment, that, because filter 30 may have a higher cut-off frequency, the response may be faster to changes in $\omega_1$.

It will be noted that with the first embodiment, where the 'reference' signal frequency is brought into correspondence with the unknown frequency (or vice versa) that the signal $k_4 \sin(\omega_o - \omega_1)\tau + K_4 \sin[2(\omega_o - \omega_1)t - 2\phi - (\omega_o - \omega_1)\tau]$ at the output of mixer 28 becomes $K_4 \sin -2\phi - K_4 \sin 2\phi$ being a signal dependent on the phase difference between the reference and unknown signals and this signal is available to adjust the phase of the reference signals. It is noted that there is an ambiguity in phase of $\pi$ radians since the argument of the sine function is $2\phi$. However additional signals to remove the ambiguity may be derived from points G and H, for example a low pass filter or integrator preferably having approximately one-half the cut-off frequency of low pass filter 30 could be connected from point H to a summing junction at point L or point M.

I claim:

1. The method of determining the frequency of a signal comprising:
   performing a first mixing of said signal with a first reference signal;
   performing a second mixing of said signal with a second reference signal obtained by altering the phase of said first reference signal by $\pi/2$ radians;
   where said reference signals are of the same frequency and differ in phase by $\pi/2$ radians;
   filtering from the products of said first mixing, a first product chosen from the class of products consisting of the sum and the difference of the mixed signals;
   filtering from the class of products of said second mixing, a second product chosen from the class of products comprising the sum and the difference of the mixed signals, the choice being the same as for said first product;
   delaying one of said filtered mixer products relative to the other by a delay $\tau$, delay $\tau$ being chosen from the class of functions consisting of a constant or a function of frequency;
   mixing in a third mixing step said delayed one mixer product and said other mixer product, while ensuring that the products mixed are of substantially constant amplitude.

2. The method as claimed in claim 1 wherein said filtering is performed so that the first product comprises the difference of the mixed signals, the second product comprises the difference of the mixed signals, and the output of the third mixing step is filtered to pass only signals of smaller frequency than a predetermined value.

3. The method as claimed in claim 1 wherein said filtering of the products from said first mixing is performed so that the first product comprises the sum of the mixed signals, and said filtering of the products from said second mixing is performed so that the second product comprises the sum of the mixed signals, the output of the third mixing step is filtered to pass only signals of smaller frequency than twice the sum the unknown and the reference frequency.

4. A method as claimed in claim 2 wherein the filtering of the third mixing step output is performed so as to pass signals of frequency of sufficiently low value that the time varying component of the output signal from the third mixing step is small relative to the non-time varying component.

5. Means for obtaining a signal indicative of an unknown frequency comprising:
   means for deriving from a signal of a reference frequency, two signals of said frequency differing from each other in phase by $\pi/2$ radians;
   a pair of means designed and connected to mix said unknown frequency, at two separate locations with each of said respective derived frequencies;
   means corresponding to each said mixing means for deriving from the output of the corresponding mixer, a signal which is chosen from the class of possible outputs of said mixer which consists of a signal having the frequency of the sum and a signal having the frequency of the difference of the frequencies of the signals mixed;
   and where each said means for deriving is designed to derive the same type of signal (i.e., sum or difference of frequencies) from the mixer with which it is connected;
   means are provided for delaying one of said derived signals relative to the other; by the delay $\tau$, where $\tau$ is chosen from the class of functions consisting of a constant or a function of frequency;
   third mixing means are provided for mixing said delayed signal and the other of said derived signals to produce the product thereof.

6. A device as claimed in claim 5 wherein means are provided to ensure that the signals mixed at said third mixing means are of substantially constant amplitude.

7. A device as claimed in claim 5 wherein said delay is a function of the difference of said reference and said unknown frequencies.

8. A device as claimed in claim 6 wherein said delay is a function of the difference of said reference and said unknown frequencies.

9. A device, as claimed in claim 5 wherein said delay is a constant.

10. A device as claimed in claim 6 wherein said delay is a constant.

11. A device as claimed in claim 6 wherein said delay is chosen so that the product of $2\pi$ times the delay times the difference in frequency over the expected unknown frequency range is not greater than $\pi$ and located between adjacent, odd, integral values of $\pm \pi/2$.

12. A device as claimed in claim 7 wherein said deriving means are designed to derive a signal having the frequency of the difference of the signals mixed.

13. A device as claimed in claim 8 wherein said deriving means are designed to derive a signal having the frequency of the difference of the signals mixed.

14. A device as claimed in claim 9 wherein said deriving means are designed to derive a signal having the frequency of the difference of the signals mixed.

15. A device as claimed in claim 10 wherein said deriving means are designed to derive a signal having the frequency of the difference of the signals mixed.

16. A device as claimed in claim 11 wherein said deriving means are designed to derive a signal having the frequency of the difference of the signals mixed.

17. A device as claimed in claim 7 wherein said deriving means are designed to derive a signal having the frequency of the sum of the signals mixed.

18. A device as claimed in claim 8 wherein said deriving means are designed to derive a signal having the frequency of the sum of the signals mixed.

19. A device as claimed in claim 9 wherein said deriving means are designed to derive a signal having the frequency of the sum of the signals mixed.

20. A device as claimed in claim 10 wherein said deriving means are designed to derive a signal having the frequency of the sum of the signals mixed.

21. A device as claimed in claim 11 wherein said deriving means are designed to derive a signal having the frequency of the sum of the signals mixed.

22. A device as claimed in claim 12 combined with means for receiving the output from said third mixing means and for producing therefrom an output from which frequencies higher than a predetermined value have been removed.

23. A device as claimed in claim 13 combined with means for receiving the output from said third mixing means and for producing therefrom an output from which frequencies higher than a predetermined value have been removed.

24. A device as claimed in claim 14 combined with means for receiving the output from said third mixing means and for producing therefrom an output from which frequencies higher than a predetermined value have been removed.

25. A device as claimed in claim 15 combined with means for receiving the output from said third mixing means and for producing therefrom an output from which frequencies higher than a predetermined value have been removed.

26. A device as claimed in claim 16 combined with means for receiving the output from said third mixing means and for producing therefrom an output from which frequencies higher than a predetermined value have been removed.

27. A device as claimed in claim 17 combined with means for receiving the output from said third mixing means and for producing therefrom an output from which frequencies of twice the sum of the unknown and reference frequency, and higher, have been removed.

28. The method as claimed in claim 1 combined with the added step of filtering the output of the third mixer step to substantially remove the time varying component therefrom.

* * * * *